US006771672B1

(12) United States Patent
Ansley et al.

(10) Patent No.: US 6,771,672 B1
(45) Date of Patent: Aug. 3, 2004

(54) SIGNALING BIT SUPPRESSION SYSTEM

(75) Inventors: Carol J. Ansley, Dawsonville, GA (US); Kevin A. West, Duluth, GA (US)

(73) Assignee: Nortel Networks Limited, St. Laurent (CA)

( * ) Notice: Subject to any disclaimer, the term of this patent is extended or adjusted under 35 U.S.C. 154(b) by 818 days.

(21) Appl. No.: 09/630,942

(22) Filed: Aug. 3, 2000

(51) Int. Cl.[7] .................................................. H04J 3/12
(52) U.S. Cl. ....................................... 370/522; 375/362
(58) Field of Search ............................. 370/522, 521, 370/523, 527, 528, 529, 477; 375/362–366, 368, 340, 354, 358

(56) References Cited

U.S. PATENT DOCUMENTS

| | | | | | |
|---|---|---|---|---|---|
| 4,747,112 A | * | 5/1988 | Blondeau et al. | ........... | 375/293 |
| 4,757,499 A | * | 7/1988 | Gorshe | ........................ | 370/376 |
| 5,020,058 A | * | 5/1991 | Holden et al. | .............. | 370/474 |
| 6,104,730 A | * | 8/2000 | Marks | ......................... | 370/523 |
| 6,324,187 B1 | * | 11/2001 | Watanabe et al. | ........... | 370/522 |
| 6,483,857 B1 | * | 11/2002 | Sloan et al. | ................. | 370/522 |

\* cited by examiner

Primary Examiner—Ajit Patel
Assistant Examiner—Chirag Shah
(74) Attorney, Agent, or Firm—Withrow & Terranova, PLLC

(57) ABSTRACT

An invention for detecting and suppressing bits of data present in a given communications environment. One exemplary embodiment allows the invention to suppress the signaling bits in a communications system that is using the GR-303 protocol. Another embodiment allows the invention to suppress any given bit which may be deterministically positioned for suppression. In a GR-303 environment, the invention suppresses signaling bits found to hamper older equipment that is still in service in the communications environment. The invention receives particular bit of the incoming word of data, which is compared to the particular bit of the previous word of data in the same phase (logically associated bits). If a transition or pattern is detected that indicates a specific signaling bit pattern presence, an integrator counts toward a user-defined maximum saturation value. At saturation, the invention suppresses the signaling bit that has been detected. If the invention detects that non-signaling bits are present, it will stop suppressing the particular bit of the incoming data.

42 Claims, 6 Drawing Sheets

| Frame | Phase | PCM Words | | | | | | | |
|---|---|---|---|---|---|---|---|---|---|
| 1 | 1 | 7 | 6 | 5 | 4 | 3 | 2 | 1 | 0 |
| 2 | 2 | 7 | 6 | 5 | 4 | 3 | 2 | 1 | 0 |
| 3 | 3 | 7 | 6 | 5 | 4 | 3 | 2 | 1 | 0 |
| 4 | 4 | 7 | 6 | 5 | 4 | 3 | 2 | 1 | 0 |
| 5 | 5 | 7 | 6 | 5 | 4 | 3 | 2 | 1 | 0 |
| 6 | 6 | 7 | 6 | 5 | 4 | 3 | 2 | 1 | A |
| 7 | 1 | 7 | 6 | 5 | 4 | 3 | 2 | 1 | 0 |
| 8 | 2 | 7 | 6 | 5 | 4 | 3 | 2 | 1 | 0 |
| 9 | 3 | 7 | 6 | 5 | 4 | 3 | 2 | 1 | 0 |
| 10 | 4 | 7 | 6 | 5 | 4 | 3 | 2 | 1 | 0 |
| 11 | 5 | 7 | 6 | 5 | 4 | 3 | 2 | 1 | 0 |
| 12 | 6 | 7 | 6 | 5 | 4 | 3 | 2 | 1 | B |
| 13 | 1 | 7 | 6 | 5 | 4 | 3 | 2 | 1 | 0 |
| 14 | 2 | 7 | 6 | 5 | 4 | 3 | 2 | 1 | 0 |
| 15 | 3 | 7 | 6 | 5 | 4 | 3 | 2 | 1 | 0 |
| 16 | 4 | 7 | 6 | 5 | 4 | 3 | 2 | 1 | 0 |
| 17 | 5 | 7 | 6 | 5 | 4 | 3 | 2 | 1 | 0 |
| 18 | 6 | 7 | 6 | 5 | 4 | 3 | 2 | 1 | C |
| 19 | 1 | 7 | 6 | 5 | 4 | 3 | 2 | 1 | 0 |
| 20 | 2 | 7 | 6 | 5 | 4 | 3 | 2 | 1 | 0 |
| 21 | 3 | 7 | 6 | 5 | 4 | 3 | 2 | 1 | 0 |
| 22 | 4 | 7 | 6 | 5 | 4 | 3 | 2 | 1 | 0 |
| 23 | 5 | 7 | 6 | 5 | 4 | 3 | 2 | 1 | 0 |
| 24 | 6 | 7 | 6 | 5 | 4 | 3 | 2 | 1 | D |

*FIG. 2*

SIGNALING BIT SUPPRESSION SYSTEM

TECHNICAL FIELD

This invention relates to detecting and suppressing signaling bits in a communications system and, more particularly, to suppressing the signaling bits in a GR-303 communications system.

BACKGROUND OF THE INVENTION

Communications systems change standards as they evolve over the years. The new standards and other reasons may cause the need to suppress bits in transmitted data. This is particularly true when new communications standards call for instructional or signaling bits to be implemented that hamper legacy equipment. Legacy equipment is that equipment utilized before new standards are implemented, which remains after the new communications standards are implemented.

An example of one such situation can be seen in a GR-303 system. GR-303 is a communications transmission loop standard that has become very popular, because it provides a modern standard that can help reduce operating costs and capital investment for equipment. In a GR-303 system, the Pulse Code Modulated ("PCM") payload contains signaling bits in the least significant bit position for signaling and equipment control. However, the position of the signaling bit will be termed the particular bit for the universal scope of the invention. The signaling bits are extracted by the hardware at either the switch, central office, or the customer equipment, but they still remain in the PCM. Since the signaling bits occur only every six frames, they have little effect on the characteristics of the corresponding channel. However, the signaling bits are still present and may impact the performance of legacy hardware associated with the communications system.

The V.90 modem is an example of legacy equipment, wherein the performance is hampered by receiving signaling bits. Modem manufacturers are aware of V.90 field problems, when operating over some Cable Telephony/Hybrid Fiber Coax circuits that use GR-303 and T1 403.2 signaling. While there are some V.90 modems that were designed to handle this situation, a large percentage (estimated 90%) of legacy V.90 modems fallback to V.34 mode, fallback to low speed V.90, or have significantly reduced throughput.

Thus, there is a need in the art to suppress signaling or other particular bits in a communications environment to ensure that equipment capability will not be hampered as the communications industry standards change. The need should be met without excessive costs to implement new inventions or to update the existing equipment. There is a particular need for signaling bit suppression in the GR-303 communications environment.

SUMMARY OF THE INVENTION

The present invention overcomes the above described problems by utilizing a circuit, system, and algorithm to suppress the signaling bits or other problem causing bits, without the need to remove expensive equipment already being utilized in the communications system.

Generally described, the invention receives an incoming word of PCM information. The particular bit of that incoming word is received by a comparator, a compare-in input of a random access memory (RAM) or other readable memory device, and one input of a suppression function. The comparator compares the particular bit of the current incoming word of received data to the particular bit of a previous word of data in the same phase, which was stored in the RAM. A word of data can be any size of continuous logically associated bits. Thus a word that is one byte long would contain eight bits. The results of the comparison determine whether or not a specific signaling bit pattern is indicated. When there is an indication of a specific signaling bit pattern presence, the comparator outputs a transition signal with an increment value. When the comparator indicates there is not a specific signaling bit pattern present, the comparator outputs a transition signal with a decrement value. The integrator steps (counts) up to a user-defined maximum or back down to zero (0) based on the results of the comparator, whether the integrator is already at a user-defined maximum value ("suppression mode") or zero ("non-suppression mode"), and the status of the integrator count prior to receiving the comparator signal. The suppression mode status (suppression-stat variable) and the count of the integrator are stored in the random access memory and fed-back to the integrator, via an algorithm function. If the integrator is in suppression mode, a logical high output is the suppression signal that is sent to the suppression function. However, if the integrator is in the non-suppression mode, a logical low output is the suppression signal that is the input sent to the suppression function. The suppression function output is based on the particular bit of the incoming received word input and the input from the integrator. The suppression function output suppresses the particular bit of the received word if the integrator is in suppression mode and passes the particular bit of the received word with an unchanged value, if the integrator is in a non-suppression mode. A combiner function creates an output word of data. The combiner function uses the suppression function output as the particular bit of the output word, and all the bits of the incoming word of data as the bits of the output word, except for the particular bit. This output word of data reflects the incoming word of data with suppressed signaling bits.

One skilled in the art will recognize that the invention need not be implemented with discrete solid state, semiconductor, and digital logic components. One embodiment of the invention utilizes a memory element, and a processing unit. The memory element provides storage capability and stores a program module. The program module contains instructions that will perform all the functions of the invention. The program module is executed by a processing unit.

One embodiment of the invention resolves the problem of legacy equipment having throughput problems in the GR-303 communications environment, particularly the V.90 modem. The problems are caused by the signaling bits used in the communications loop. In a GR-303 communications system, each channel has signaling associated with it and the signaling is done by a series of bits in the form ABCD, where A, B, C, and D are each binary bits. There are sixteen combinations of ABCD, some of which are used to signal specific information.

There are normally multiple channels on a communications line (e.g. 24 channels on a T1 line). On each active channel, the words can each be assigned arbitrary phase values such that every word is in the same phase as the word six frames earlier and the word six frames later. A phase is defined as a discrete path for data within a channel that organizes associated words of data transmitted on a channel from the others in a separate phase of that channel. All of the particular bit's from exactly one of the six phases are used for signaling bits (e.g. there are six phases per channel on a T1 line). If it were known which phase was the signaling phase, it would be a trivial task to suppress the signaling bits. Since framing information is not necessarily available, it is not known which of the six phases is the signaling phase. However, if an algorithm is employed such that both of the following conditions are satisfied:

1. Applying the algorithm to a signaling phase causes all signaling bits to be suppressed,
2. Applying the algorithm to a non-signaling phase has no effect, then it is not necessary to identify the signaling phase. Each channel in a GR-303 signaling system can be broken up into six independent phases, and the same algorithm can be applied to all six phases. One aspect of the present invention operates to identify the presence of a specific signaling bit pattern without having to identify the signaling phase or the signaling pattern content (the make-up of the ABCD pattern). By eliminating the task of explicitly identifying the signaling pattern or the signaling phase, the invention's circuitry and algorithm are simplified.

However, it should be noted that since the invention looks for the presence of a signaling pattern in any phase, there is a small, but non-zero probability that a sequence of particular bits in the PCM payload could just "happen" to resemble a signaling pattern. This small probability is nearly impossible to avoid, since each PCM channel is nominally a clear channel. Thus, condition number 2, applying the algorithm to a non-signaling phase has no effect, may be difficult. The more selective the algorithm is at identifying signaling patterns, the smaller the probability of falsely suppressing non-signaling bits becomes. High selectivity of identifying signaling patterns comes at the expense of the reliability of the suppression functionality. The more selective the algorithm is at detecting signaling patterns, the longer it will take to begin suppressing a signaling pattern. The longer the time to begin suppressing a signaling pattern, the greater the effect bit errors will be on the ability for the algorithm to detect a signaling pattern and maintain the signaling bit suppression condition.

One goal of the invention is to suppress the signaling bit patterns that cause equipment to malfunction. A second goal of the invention is to be able to suppress any deterministically positioned bit in data flow. Thus, the invention may be utilized in any situation where bit suppression is needed. The stated goals have been achieved by designing an economical circuit to suppress the signaling bits, rather than replacing the legacy equipment at a substantial cost.

BRIEF DESCRIPTION OF THE DRAWINGS

FIG. 2 is a table showing the 24 frames used to capture the signaling bits in a GR-303 channel.

DETAILED DESCRIPTION

Figure 1A:
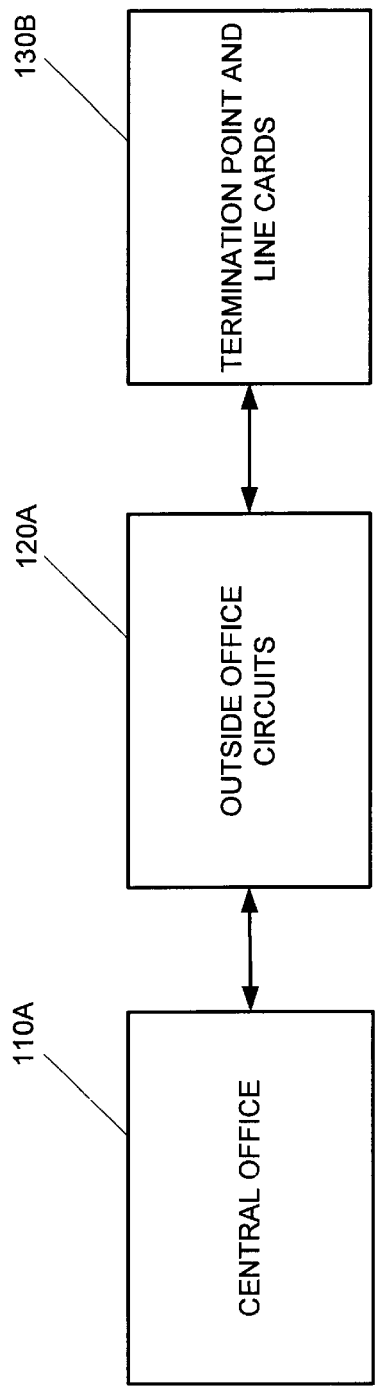
FIG. 1A is a block diagram showing an exemplary communications environment in which the invention may be used, where the line cards are deployed at the termination point.

Now referring in detail to the drawings, in which like numerals refer to like parts throughout the several views, FIG. 1A is a block diagram showing an exemplary communications environment in which the invention may be deployed, where the line cards are deployed at the termination point. Those skilled in the art will understand that this communications environment is not a limitation on the types of environments which the invention may used. The transmission is typically generated from the central office 110A in a GR-303 communications system. Its PCM transmission includes the signaling bits which control the line cards that are typically located at the transmission destination, depicted in FIG. 1A as termination point/line cards 130A. The outside office circuits 120A is the medium for transmission of the PCM communications in the GR-303 environment. Though the termination point/line cards 130A may utilize the signaling bits, the legacy equipment receiving the same transmission are usually hampered by the signaling bits. The invention is therefore employed such that the terminal/line cards 130A may utilize the signaling bits and the legacy equipment is protected from the signaling bits.

Figure 1B:
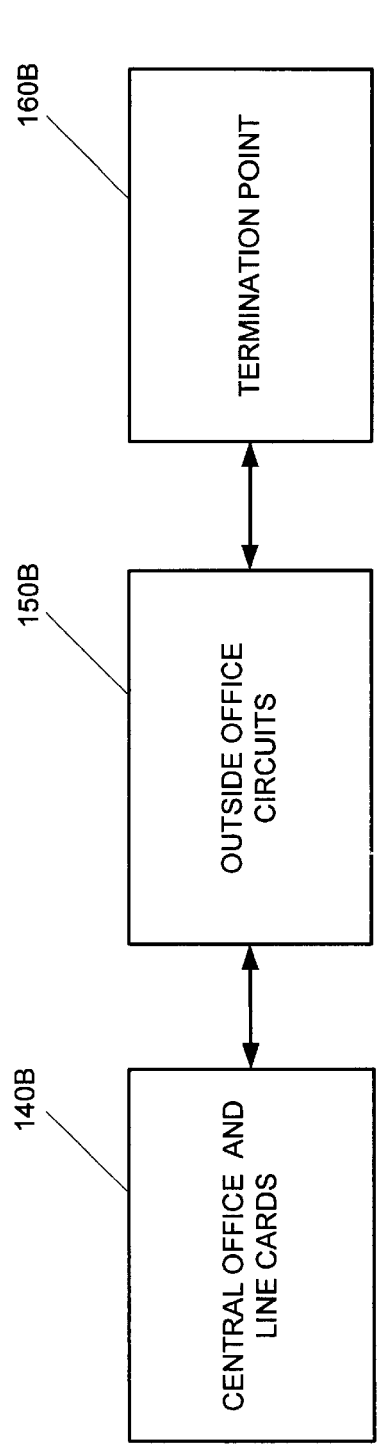
FIG. 1B is a block diagram showing an exemplary communications environment in which the invention may be used, where the line cards are deployed at the Central Office (transmission point).

FIG. 1B is a block diagram showing an exemplary communications environment in which the invention may be deployed, where the line cards are deployed at the Central Office (transmission) point. This exemplary communications environment is the same as that shown in FIG. 1A, except the line cards deployed at the central office. Thus the central office/line cards are shown as 140B. The transmission medium is outside plant circuits 150B. The transmission destination is termination point 160B. The objective of the invention remains the same in this communications environment as that of FIG. 1A. Thus, the invention is used in a manner which allows line cards to receive the transmission with signaling bits, but the legacy equipment receives the transmitted data with suppressed signaling bits.

FIG. 2 is a table showing the 24 frames used to capture the signaling bits in a GR-303 channel. Many of the cable telephony circuits use an ABCD signaling bit pattern of 0101 for indicating Loop Current Feed (LCF) condition. Most V.90 modems are optimized for operation with signaling patterns of 0000 or 1111 and don't operate well over circuits with 0101 signaling bit patterns. Every PCM channel, which transmits information at one word per 125 msec frame 210, or 64 kbits/sec, has every sixth particular bit used as a signaling bit. Therefore, it takes a total of 24 words 230, or 24 frames 210, from a channel in order to send all four signaling bits shown in the particular bit position 240 as A, B, C and D. Thus, a frame 210 is the time it takes to transmit or receive one word of data on a communications channel.

By way of example, there are six phases (numbered 1–6) 220 per channel in a typical T-1 transmission medium. The signaling in a given GR-303 channel is done by one of the phases 220 per channel. FIG. 2 shows how the signaling is sent in a group of 24 frames 210. Note that all of the signaling bits (the shaded bits), as shown in FIG. 2, belong to the same phase 220. Thus, they formulate the signaling phase for that particular channel.

Figure 3:
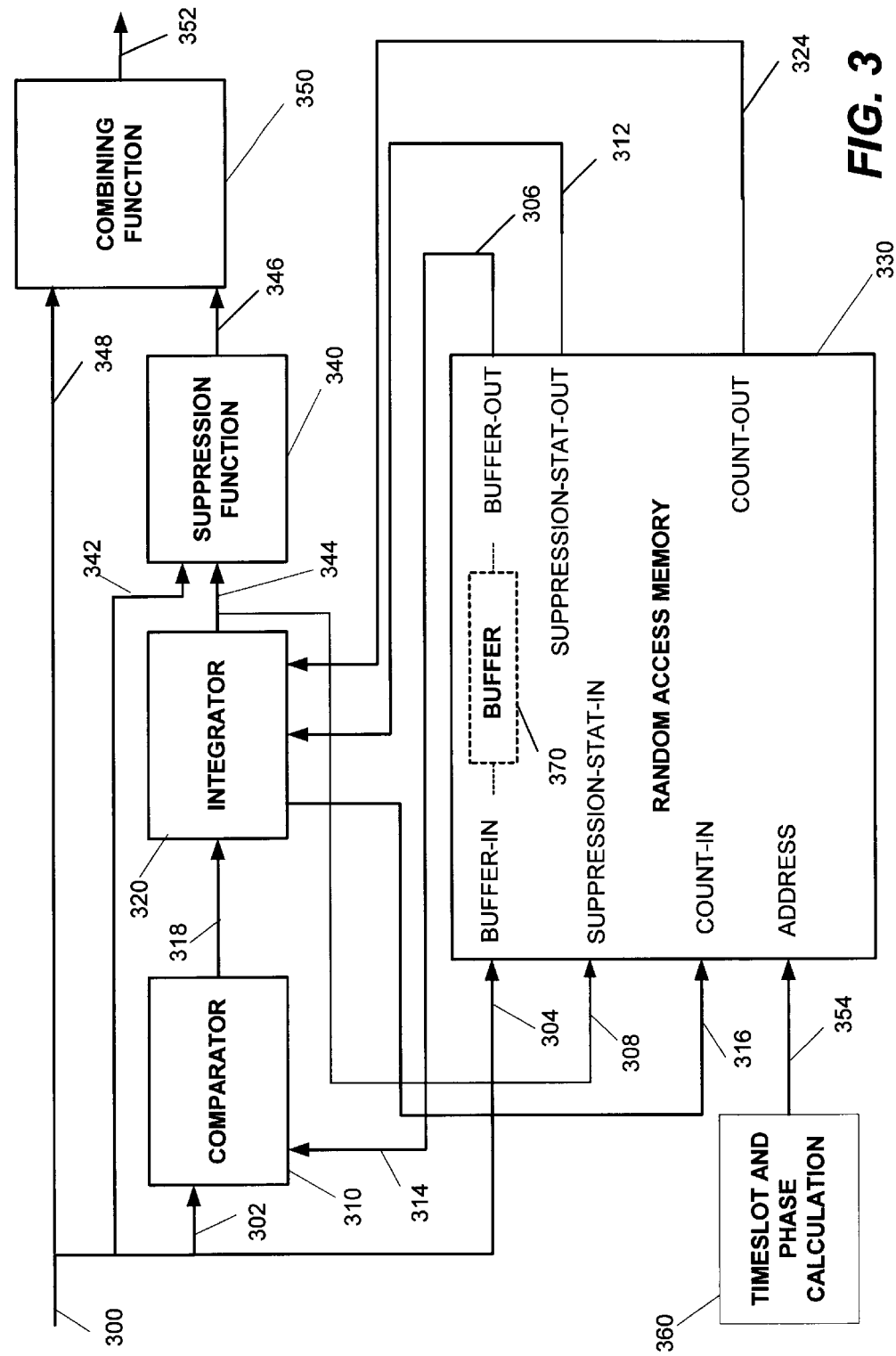
FIG. 3 is a block diagram of an exemplary embodiment of the invention.

FIG. 3. is a block diagram of an exemplary embodiment of the present invention. An input transmission line 300 receives the input GR-303 data words. The comparator 310 is connected to the transmission line 300 in a manner that comparator 310 receives the particular bit of the current word of data at line 302. The RAM 330 also has one input connected to the particular bit of the current word of data from the input transmission line 300 (buffer-in 304) for providing a delay, such that the RAM 330 buffer-out output 306 is delayed n frames from the incoming particular bit of the current word of data (n=6 in a GR-303 communications environment). The buffer-out output 306 is designated the previous word of data in reference to the buffer-in input 304 of RAM 330, because its the prior word of data in the same phase. The RAM 330 also has a suppression-stat-in input 308, a suppression-stat-out output 312, a count-in input 316, and a count-out output 324. The buffer-out output 306 of RAM 330 is the second input 314 to comparator 310. The comparator 310 has a transition signal with an increment or decrement value on line 318, based on its comparison of the particular bit of the received word of data and the particular bit of the previous word of data received from the buffer-out output 306 of RAM 330. An Integrator 320 receives the transition signal with an increment or decrement value on line 318 from comparator 310. Integrator 320 counts up to a user-defined threshold or back down to zero (0) according to the results of the comparator 310 and the present status of integrator 320. The suppression function 340 receives the particular bit of the received word of data at a first input 342 and the output of integrator 320 as a second input 344. The suppression function 340 suppresses the signaling bit or passes the particular bit of the received word of data without change, according to the integrator 320 output. The combining function 350 receives the suppression function 340 output on line 346 and the seven MSBs of the received word of data on line 348; the inputs combination forms an output word reflecting the received word of data with suppressed signaling bits where appropriate on output 352. The timeslot and phase calculation 360 is connected by line 354 to RAM 330 for synchronization of the incoming data words such that they are addressed by their respective channel and phase.

The purpose of the comparator 310 is to supply the integrator 320 with either a transition signal with an increment or decrement value, based on its comparison of the particular bit of the current word of data and the particular bit of the previous word of data. The comparator 310 transition signal with an increment value moves the integrator 320 towards the suppression mode, while a comparator 310 transition signal with a decrement value moves the integrator 320 to a non-suppression mode. The comparator 320 generates the transition signal with an increment or decrement value by comparing the current particular bit (which may or may not be a signaling bit) to a history of particular bits for the current phase of the current channel. There are two methods and distinct embodiments to determine whether the current particular bit generates a transition signal with an increment or a decrement value: (a) detect transitions only, or (b) detect general patterns. To detect transitions only would suppress a pattern such as ABCD=0101 or ABCD=1010, the signaling patterns that cause the greatest problem for legacy equipment such as the V.90 modem. To detect general patterns of ABCD would suppress any consistent ABCD signaling pattern, except for ABCD=0000 or ABCD=1111 (which don't need to be suppressed).

For the detect transitions embodiment, a history of particular bits is maintained. The history has a size of a specified number of bits, where history≧1. The history(bit_one) is the newest particular bit in the history and the history(bit_oldest) is the oldest particular bit in the history. The particular bit of the current word, not yet stored in the history, is history(0). A comparator 310 transition signal with an increment value occurs if the following is true:

$$\text{history}(x) \neq \text{history}(x-1) \text{ for every } x \in [1, \text{bit\_oldest}]$$

Those skilled in the art will understand the above formula requires that the entire history, including the particular bit of the current word of data, is a pattern of alternating 1's and 0's. A pattern of alternating 1's and 0's occurs in the signaling phase if and only if the ABCD signaling pattern is 0101 or 1010. Any other signaling pattern will fail to generate a stream of comparator 310 hits. The higher bit_oldest is, the less probability a false suppression mode will occur, but the less tolerant the suppression function is to bit errors.

For the detect general patterns mode of operation, a history of particular bits is also maintained. The history has a size of a specified number of bits, where history is greater than or equal to 4. The history(bit_one) is the newest particular bit in the history and the history(bit_oldest) is the oldest particular bit in the history. The particular bit of the current word, not yet stored in the history, is history(0). A comparator 310 transition signal with an increment value occurs if the following is true:

$$\text{history}(x) = \text{history}(x-4) \text{ for every } x \in [4, \text{bit\_oldest}]$$

and also the following is NOT true:

$$\text{history}(0) \neq \text{history}(1) \neq \text{history}(2) \neq \text{history}(3)$$

Those skilled in the art will understand the first condition above requires that the entire particular bit history, including the particular bit of the current word of data, be a pattern which matches the form wxyzwxyzwxyz .... Such a repeating pattern of four bits should always occur in the signaling phase in a GR-303 communications system. The second condition above makes an exception for the cases when all of the bits are 1's or all of the bits are 0's. The exception would correspond to signaling patterns of ABCD=1111 and ABCD=0000, respectively. These signaling patterns do not need to be suppressed. The higher the specified number of bits contained in the history, the less probability of a false suppression mode, but the less tolerant the suppression function is to bit errors. Note that in identifying the presence of a repeating pattern of four bits, the actual signaling pattern is not identified. A repeating pattern of 10111011101110111011 . . . could be ABCD=1011, 0111, 1110, or 1101. Identifying the exact signaling pattern is not necessary in order to suppress the signaling bits.

In general, for a given value of bit_oldest, the detect transitions method will produce a lower probability of false suppression modes than the detect general patterns method. This is because fewer patterns generate a comparator hit with the detect transitions method than the detect general patterns method.

The transition signals with an increment or decrement value from the comparator 310 are inputs to the integrator 320. For each phase, a counter is maintained by the RAM 330, to control and maintain the integration function of integrator 320. The minimum value of the integrator 320 is zero (0). The maximum value of the integrator 320 is a user-defined maximum value. Whenever the integrator 320 reaches its user-defined maximum value, the suppression mode is set, which means the particular bit of the current phase of the current channel is suppressed. Whenever the integrator has a value of zero (0), the suppression mode is cleared. The suppression mode is stored by the RAM 330 as a suppress-stat-in input 308 and is fed back to the integrator 320 from the RAM 330 suppress-stat-out output 312. The new state of the integrator 320 is completely determined by the current count of the integrator 320, the current comparator 310 output status 318, and the current suppression mode 312 of integrator 320. The current count of integrator 320 and the suppression mode of integrator 320 is monitored by RAM 330, processed by the algorithm, and fed back to integrator 320 from the count-out output 324 and the suppression-stat-out output 312 of RAM 330, respectively. Table 1 below shows how these current values affect the integrator 320:

TABLE 1

Integrator 320 Actions

| Comparator Output 318 | Suppression Mode of Integrator 320 | Action |
|---|---|---|
| transition signal with a decrement value | Not set | Reset integrator 320 to zero (0) |
| transition signal with a decrement value | Set | (See "Comparator transition signal with a decrement value occurs while the suppression mode is set" below) |
| transition signal with an increment value | Not set | Increment integrator 320 by 1 (saturate at user-defined maximum value) |
| transition signal with an increment value | Set | Increment integrator 320 by 1 (saturate at user-defined maximum value) |

As evident from Table 1, when a comparator 310 transition signal with a decrement value occurs, and the suppression status for the current phase is not yet set, then the integrator is reset to zero (0), regardless of how close the value is to the user-defined maximum value. A stream of consecutive comparator 310 transition signals with an increment value equal to the user-defined maximum value is required in order for suppression mode to begin. This has the affect of decreasing the probability of non-signaling bits being suppressed.

When a comparator 310 transition signal with a decrement value occurs while the suppression mode is set, the integrator 320 will decrement by some non-suppress decrement value. The non-suppress decrement value is a user-defined value. There is a trade-off associated with the manner in which the integrator 320 decrements: low probability of false suppression mode (the suppressing of a non-signaling phase) vs. bit error tolerance. If the integrator 320 decrements rapidly, then the suppression function has a low probability of a false suppression mode, but it has a lower tolerance to bit errors. A burst of bit errors may cause the integrator to count all the way down to zero (0) and clear the suppression status, which would be undesirable. On the other hand, if the integrator 320 decrements slowly, the suppression function has a high tolerance to bit errors, but it is more likely to cause a false suppression mode.

As an example, let h'=history(storage) if the comparator method is "Detect Transitions" and let h'=history(storage)−3 if the comparator method is "Detect General Patterns". Then, h' is the number of frames that a bit in history will be compared to other bits in order to determine a comparator hit or miss and h(storage) is the number of particular bits in the history. If a bit in the signaling phase is wrong due to a bit error on the channel, then the single bit error will cause h'+1 comparator misses.

One skilled in the art will understand that there are several ways which the integrator may decrement to a non-suppress value of zero (0). Though four different decrement the integrator schemes are described below, these are not a limitation on the ways to decrement the integrator but are only offered as examples of exemplary embodiments.

Decrement to 0: The integrator decrements to zero (0). A single bit error in an otherwise valid signaling phase will clear the squelch status. This is the most rapid method of decrementing the integrator.

Decrement by n: The integrator decrements by some value n. The minimum value of the integrator is zero (0), so if the integrator is at a value of n or less, then a comparator miss will cause it to be reset to zero (0). If n is greater than or equal to user-defined maximum value, the method is equivalent to "Decrement to 0". If (h'+1)n is greater than or equal to the user-defined maximum value, then a single bit error will cause suppression mode to begin.

Decrement to h'n+1 on first miss: In order to accommodate an exactly one bit error in the signaling phase without ending squelch prematurely, the integrator must follow the following rules:

1. user-defined maximum value>(h'+1)n
2. $\text{IntegratorCount}_{new}$=h'n+1,
   if $\text{IntegratorCount}_{current}$>(h'+1)n+1,
   else $\text{IntegratorCount}_{new}$=$\text{IntegratorCount}_{current}$−n, As discussed, this method will tolerate exactly one bit error in the signaling phase. Any more comparator misses (while the integrator is at n or less) will cause the integrator to go to zero (0). If n is greater than or equal to the user-defined maximum value, this method is equivalent to "Decrement to 0". If (h'+1)n is greater than or equal to the user-defined maximum value (i.e. rule 1 above is violated), then a single bit error will cause suppression to begin.

Shift Right by n: The integrator is divided by $2^n$, shifting n bits to the right. This causes the integrator to count down faster at first, but as the counter value approaches 0, the decrement rate decreases. If n is greater than int($\log_2$(user-defined maximum value)), where int( ) is the integer function and $\log_2$( ) is the base-two logarithm function, then this method is equivalent to "Decrement to 0". If (h'+1)n is greater than int($\log_2$(user-defined maximum value)), then a single bit error will cause squelch to begin.

Figure 4:
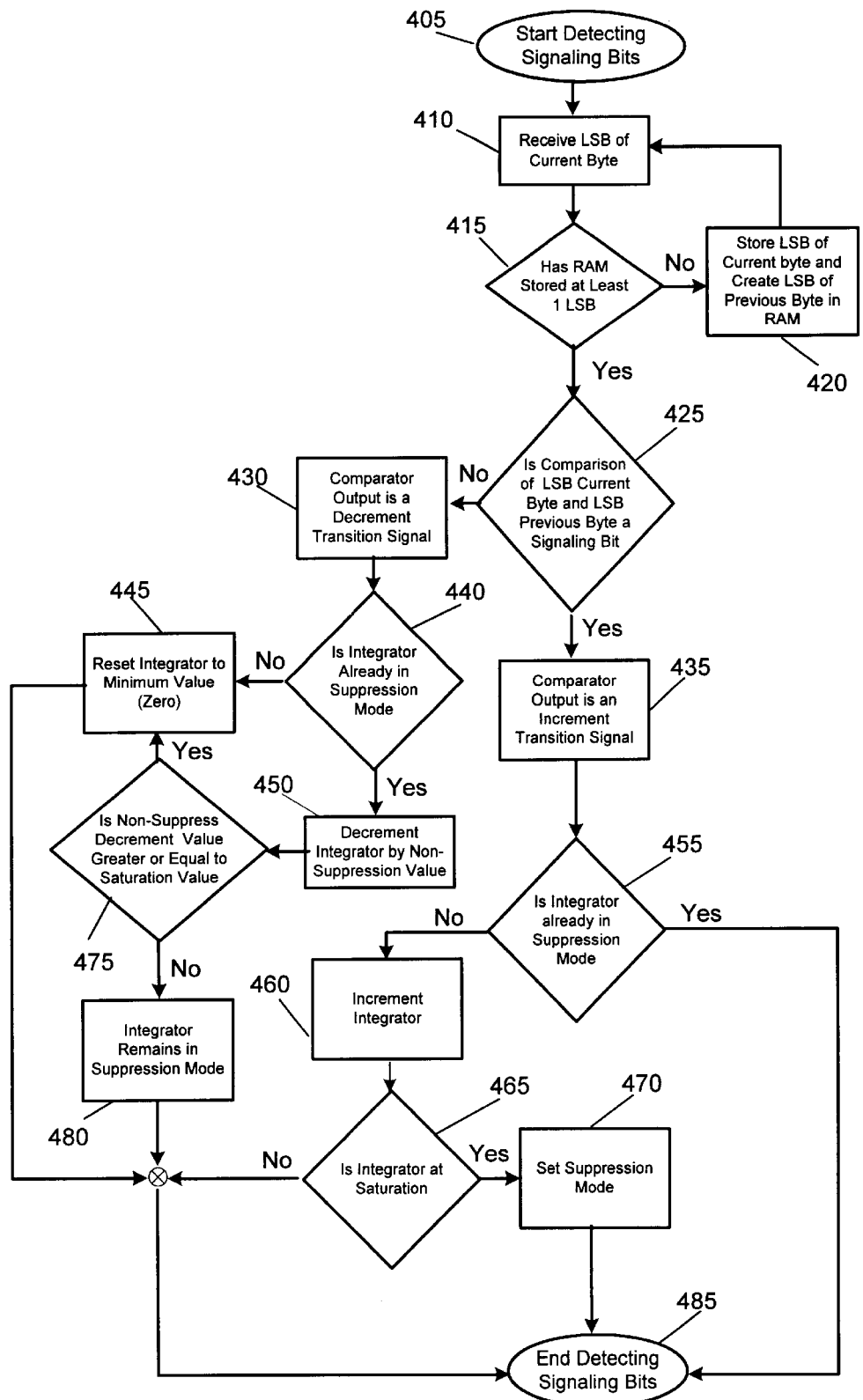
FIG. 4 is a flow diagram of steps taken to detect the signaling bits in an exemplary embodiment of the invention.

FIG. 4 is a flow diagram of steps taken to detect the signaling bits in an exemplary embodiment of the invention. The combined object of the comparator 310 and the integrator 320 is to detect signal bits. Step 405 shows the start of the detect signaling bit phase of the invention. At step 410, the particular bit of the current word of data is received by the comparator 310 and the RAM 330. At step 415, it is determined whether the RAM 330 has received at least 1 particular bit, thus created a particular bit of a previous word of data. If the RAM 330 has not created a particular bit of a previous word then processing continues at step 420, otherwise processing continues at step 429.

At step 420 the RAM 330 stores the particular bit of the current word, and provides a delay, using a buffer 370 until another particular bit of a current word is received in the same phase. Processing then returns to step 410.

At step 425 the comparator receives the input of the particular bit of the current word and compares it with the particular bit of the previous word. If the comparison detects a transition between the particular bits from 1 to zero (0) or zero (0) to 1 then the processing continues at step 435. Otherwise, processing continues at step 430.

At step 435, a transition signal with an increment value is created that is an input to integrator 320 and processing continues at step 455.

At step 455, if the integrator 320 is already in suppression mode (i.e., the integrator is at the user-defined maximum value and the RAM 330 suppression-stat-out is set) then it remains in suppression mode to suppress the detected signaling bit of the current word, ending the detect signaling bit phase process at step 485. If integrator 320 is not already in suppression mode, processing continues at step 460 and the integrator 320 is incremented. Processing then continues at step 465. At step 465, if the incrementing of integrator 320 increases the integrator 320 count to the point of saturation(a suppression value), the RAM 330 suppress-stat-in is set at step 470. The process moves from step 470 to the end of the detect signaling bit process at step 485.

At step 430 a transition signal with a decrement value is created that is an input to integrator 320. Following a transition signal with a decrement value at step 430, processing continues at step 440 to determine if integrator 320 is in saturation mode. If integrator 320 is not in the suppression mode at step 440, the integrator 320 is reset to zero (0) at step 445. From step 445, the processing continues to the end of the detect signaling bit process at step 485.

If integrator 320 is in suppression mode processing continues at step 450, where the integrator 320 receives a decrement by a non-suppression decrement value, set by the user. The different schemes to decrement integrator 320 are discussed above. At step 475, it is determined whether the non-suppression value is greater than or equal to the user-defined maximum value of integrator 320. If the non-suppression decrement value is greater than or equal to the user-defined maximum value of integrator 320, the integrator 320 is reset to zero (0) at step 445. From step 445, the process moves to the end of the detect signaling bit process at step 485. If the non-suppression decrement value is less than the user-defined maximum value at step 475, the integrator 320 retains its suppression mode at step 480. From step 480, the process moves to the end of the detect signaling bit process at step 485.

Figure 5:
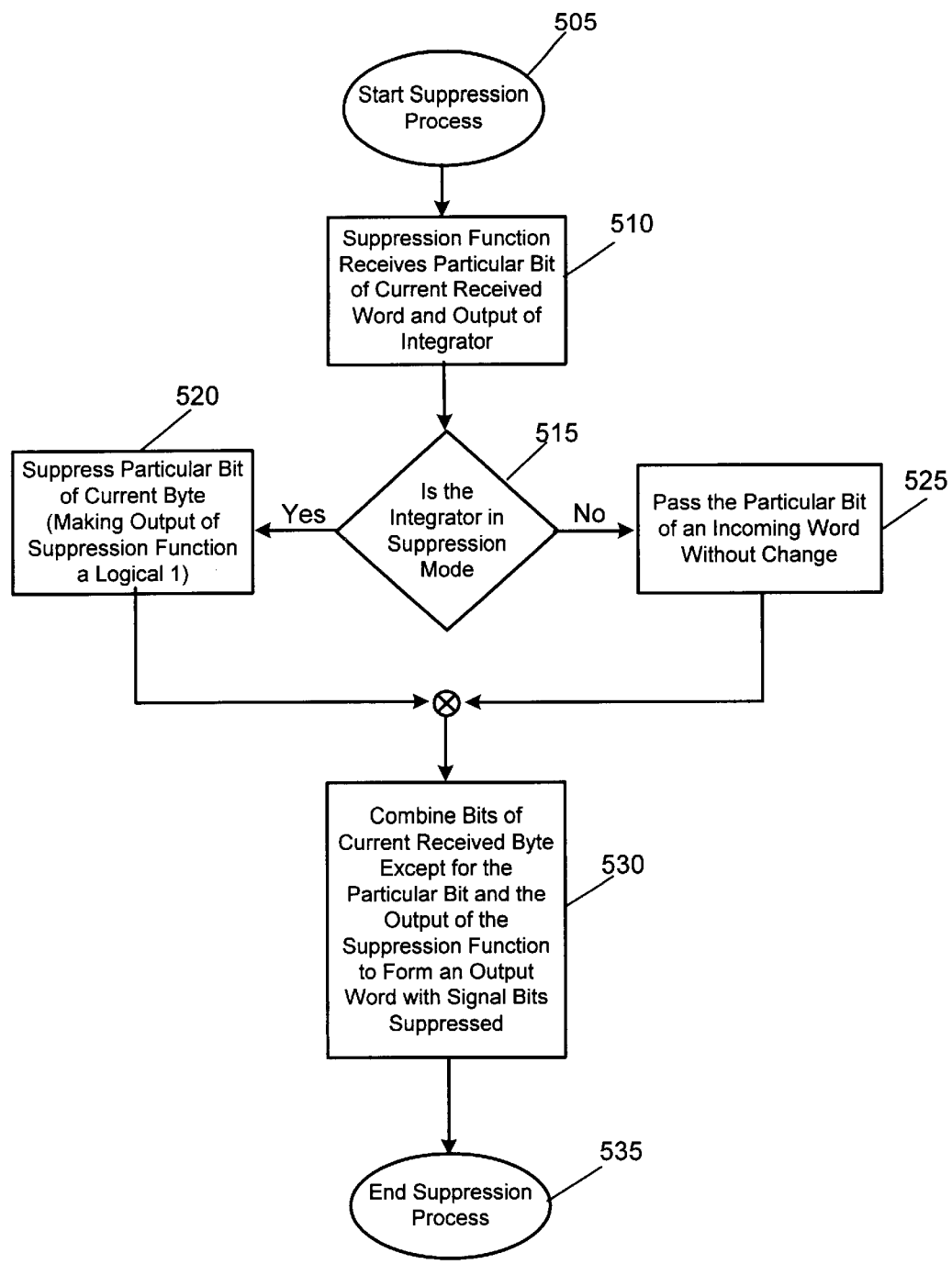
FIG. 5 is a flow diagram of steps taken to suppress the signaling bits in an exemplary embodiment of the invention.

FIG. 5 is a flow diagram of steps taken to suppress the signaling bits in an exemplary embodiment of the invention. After the detect signaling bit process, processing begins at the suppression process, step 505. At step 510, the suppression function 340 receives the output from integrator 320 and the particular bit from the current received word. After receiving the inputs at step 510, a suppression function 340 is processed on the inputs at step 515. At step 515 it is determined whether the integrator 320 is in suppression mode. If integrator 320 is in suppression mode, processing continues at step 520 and the suppression function 340 outputs a logical 1 to combining function 350, regardless of the value of the particular bit of the current word. If integrator 320 is not in suppression mode, processing continues at step 525 and the particular bit of the current word is passed to combining function 350, without a change to its value. Regardless of whether the suppression function 340 output is determined in step 520 or step 525, processing continues at step 530. At step 530, the combining function 350 combines the suppression function 340 output with the bits of the current received word, other than the particular bit of the received word. The suppression function output 340 forms an output word, which is the equivalent of the current word with the signaling bit suppressed. The suppression process ends at step 535.

For each phase of each channel, the comparator 310, integrator 320, and suppression information must be stored in a RAM 330. Access to this RAM 330 is shared by all of the phases on a time-multiplexed basis.

Figure 6:
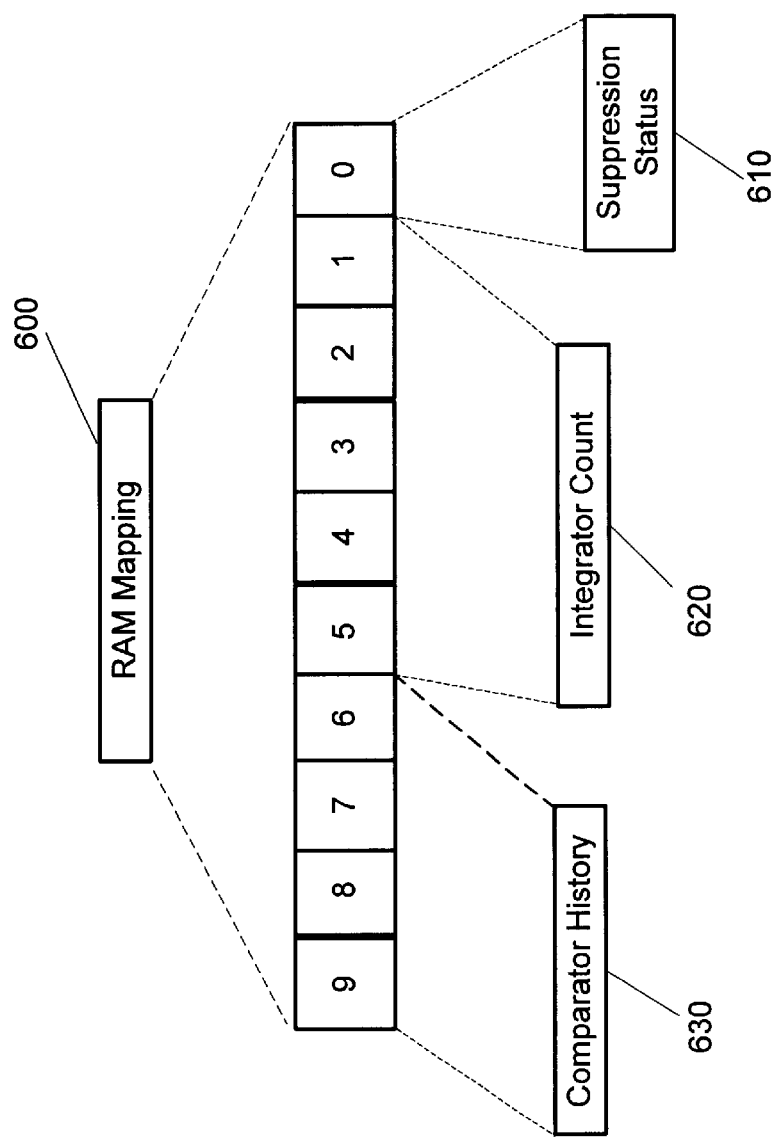
FIG. 6 is a sample of the size and mapping of the RAM necessary for given parameters of an exemplary embodiment of the invention.

FIG. 6 is a sample of the size and mapping of the RAM necessary for given parameters of in an exemplary embodiment of the invention. By way of example, the depth of the RAM 330 is equal to 6c, where c is the total number of channels. The c is multiplied by 6 because there are a total of 6 phases per channel. So, for a T1, which has 24 channels, c=24, and 6c=144. A RAM 330 that can hold all the phases for a T1 must have a depth of 144. The address to the RAM 330 could be generated in any way that assigns a unique address to each phase. The following is an example mapping from a channel number and phase number to a RAM 330 address, A, where $A \in [0, 143]$:

$24*i+j$, where $i$ is the phase number, $i \in [0,5]$ and $j$ is the channel number, $j \in [0,23]$.

The width of the RAM depends on the maximum values of history and user-defined maximum value to be supported. A sample RAM mapping 600 is shown for history=4 and user-defined maximum value $\leq 31$. The RAM mapping 600 is comprised of the Suppression Status 610, the Integrator Count 620, and the Comparator History 630.

There are several measures of performance for the bit suppression algorithm; two of which are: (a) bit error rate due to false suppression, and (b) suppression delay. These performance measures as a function of the squelch methods and parameters are shown and discussed below.

The following simulation results show the bit error rate (BER) due to false suppression as a function of the suppression parameters. In each case, the suppression algorithm is applied to a randomly generated stream of $4.18 \times 10^9$ bits, and the bit errors are counted. A particular bit is in error due to false suppression if it was originally a zero (0) and it gets suppressed to a 1 (suppressing a bit that was already a 1 does not create a bit error). Dividing the number of errors by $4.18 \times 10^9$ gives the probability of error for a single bit. In a typical T1 channel, there are 8000 samples/sec. There is one particular bit per sample, but only 5 out of 6 particular bit's are PCM (1 out of 6 is RBS), so there are (5/6)*8000= 6666.67 PCM particular bit's per second. Thus, the probability of error must be multiplied by 6666.67 to convert it to a BER. Note that in some cases, no bit errors were detected, so no BER is given.

The following simulation results are for the case when the comparator 310 is detecting transitions only (ABCD=0101 or ABCD=1010) and the comparator 310 history is one bit deep (history=1, h'=1).

TABLE 2

BER for Detect Transitions, history = 1

| M | Decrement by n | | Decrement to h'n + 1 | | Shift Right by n | | Decrement to 0 |
|---|---|---|---|---|---|---|---|
|   | n = 4 | n = 8 | n = 2 | n = 4 | n = 1 | n = 2 |   |
| 12 | $3.27 \times 10^0$ | $1.65 \times 10^0$ | $3.24 \times 10^0$ | $2.62 \times 10^0$ | $5.15 \times 10^0$ | $2.09 \times 10^0$ | $8.13 \times 10^{-1}$ |
| 16 | $2.72 \times 10^{-1}$ | $1.26 \times 10^{-1}$ | $2.02 \times 10^{-1}$ | $1.63 \times 10^{-1}$ | $3.53 \times 10^{-1}$ | $1.60 \times 10^{-1}$ | $5.03 \times 10^{-2}$ |
| 20 | $1.80 \times 10^{-2}$ | $8.29 \times 10^{-3}$ | $1.03 \times 10^{-2}$ | $8.63 \times 10^{-3}$ | $1.94 \times 10^{-2}$ | $8.36 \times 10^{-3}$ | $2.78 \times 10^{-3}$ |
| 24 | $9.92 \times 10^{-4}$ | $5.84 \times 10^{-4}$ | $5.47 \times 10^{-4}$ | $4.67 \times 10^{-4}$ | $9.38 \times 10^{-4}$ | $4.67 \times 10^{-4}$ | $1.71 \times 10^{-4}$ |
| 28 | $8.3 \times 10^{-5}$ | $3.8 \times 10^{-5}$ | $2.6 \times 10^{-5}$ | $2.6 \times 10^{-5}$ | $1.3 \times 10^{-4}$ | $2.6 \times 10^{-5}$ | $1 \times 10^{-5}$ |

The following simulation results are for the case when the comparator 310 is detecting transitions only (ABCD=0101 or ABCD=1010) and the comparator 310 history is 4 bits deep (history=4, h'=4).

TABLE 3

BER Error for Detect Transitions, history = 4

| M | Decrement by n | | Decrement to h'n + 1 | | Shift Right by n | | Decrement to 0 |
|---|---|---|---|---|---|---|---|
| | n = 4 | n = 8 | n = 2 | n = 4 | n = 1 | n = 2 | |
| 12 | $2.04 \times 10^{-1}$ | $1.53 \times 10^{-1}$ | $3.69 \times 10^{-1}$ | $2.04 \times 10^{-1}$ | $2.55 \times 10^{-1}$ | $1.53 \times 10^{-1}$ | $1.01 \times 10^{-1}$ |
| 16 | $1.49 \times 10^{-2}$ | $8.83 \times 10^{-3}$ | $2.15 \times 10^{-2}$ | $1.49 \times 10^{-2}$ | $1.83 \times 10^{-2}$ | $1.19 \times 10^{-2}$ | $5.81 \times 10^{-3}$ |
| 20 | $1.07 \times 10^{-3}$ | $6.99 \times 10^{-4}$ | $1.23 \times 10^{-3}$ | $1.07 \times 10^{-3}$ | $1.07 \times 10^{-3}$ | $6.99 \times 10^{-4}$ | $3.49 \times 10^{-4}$ |
| 24 | $8.5 \times 10^{-5}$ | $4.8 \times 10^{-5}$ | $8.5 \times 10^{-5}$ | $8.5 \times 10^{-5}$ | $7.2 \times 10^{-5}$ | $4.8 \times 10^{-5}$ | $2.4 \times 10^{-5}$ |

The following simulation results are for the case when the comparator 310 is detecting general patterns (any except for ABCD=0000 and ABCD=1111) and the comparator 310 history is 4 bits deep (history=4, h'=1).

TABLE 4

BER for Detect General Patterns, history = 4

| M | Decrement by n | | Decrement to h'n + 1 | | Shift Right by n | | Decrement to 0 |
|---|---|---|---|---|---|---|---|
| | n = 4 | n = 8 | n = 2 | n = 4 | n = 1 | n = 2 | |
| 12 | $2.56 \times 10^{0}$ | $1.39 \times 10^{0}$ | $2.49 \times 10^{0}$ | $2.14 \times 10^{0}$ | $3.68 \times 10^{0}$ | $1.70 \times 10^{0}$ | $7.12 \times 10^{-1}$ |
| 16 | $2.09 \times 10^{-1}$ | $1.04 \times 10^{-1}$ | $1.55 \times 10^{-1}$ | $1.33 \times 10^{-1}$ | $2.54 \times 10^{-1}$ | $1.30 \times 10^{-1}$ | $4.36 \times 10^{-2}$ |
| 20 | $1.53 \times 10^{-2}$ | $7.80 \times 10^{-3}$ | $9.05 \times 10^{-3}$ | $7.90 \times 10^{-3}$ | $1.53 \times 10^{-2}$ | $7.90 \times 10^{-3}$ | $2.66 \times 10^{-3}$ |
| 24 | $9.76 \times 10^{-4}$ | $5.12 \times 10^{-4}$ | $5.66 \times 10^{-4}$ | $4.32 \times 10^{-4}$ | $8.76 \times 10^{-4}$ | $4.32 \times 10^{-4}$ | $1.2 \times 10^{-4}$ |

The number of frames that it takes to begin suppressing is equal to the maximum of the parameters history and user-defined maximum value, since the comparator 310 must use a history of a specified size, and the integrator 320 must count all the way up to a user-defined maximum value before the suppression-stat-out output is set. This assumes that there are no bit errors in the signaling phase during this "sync-up" period. If the PCM rate is one word per 125 msec, then there is 750 msec between successive RBS bits, since the RBS bits only occur every sixth frame. The following table shows a sample of values and the corresponding suppression delays vs. max (history, user-defined maximum value).

TABLE 6

Suppression Delay

| max(history, user-defined maximum value) | Suppression Delay | |
|---|---|---|
| | (frames) | (msec) |
| 4 | 24 | 3 |
| 8 | 48 | 6 |
| 12 | 72 | 9 |
| 16 | 96 | 12 |
| 20 | 120 | 15 |
| 24 | 144 | 18 |
| 28 | 168 | 21 |
| 32 | 192 | 24 |
| 36 | 216 | 27 |
| 40 | 240 | 30 |

The present invention has been described in relation to particular embodiments which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

What is claimed is:

1. A method for detecting and suppressing signaling bits in a block of data, wherein the data is organized as a series of words and the signaling bits are embedded within a subset of said series of words, the method comprising the steps of:

receiving said series of words, said series of received words are organized in phases of size n such that every $n^{th}$ word in said series of words belongs to a particular phase;

detecting said signaling bits with said series of words said detecting comprising comparing the content of each word in a particular phase to identify a signaling bit sequence and generating a transition signal, the transition signal having an increment value if said signaling bit sequence is detected and a decrement value if said signaling bit sequence is not detected; and suppressing said signaling bits contained within said received words.

2. The method of claim 1, wherein n is equal to 6 and the signaling bits are restricted to a particular bit within said word, and said comparing the contents step comprises comparing the values of said particular bit within each phase of the series of words to identify the signaling bit sequence.

3. The method of claim 2, wherein said step of detecting said signaling bits further comprises the steps of:

storing a history of said particular bits of said received words, said history comprising a specified number of particular bits from previous words in the same phase that is equal to or greater than one;

if said history has reached said specified number of said particular bits of said received words, remove oldest said particular bit in said history and store a newest said particular bit from said received words in a first in first out data flow method;

within each phase, comparing the particular bit of a current received word with the particular bit of a previous said word;

as a result of said comparing step, generating a transition signal, the transition signal having an increment value if said comparing step indicates a bit transition for every particular bit in said history, and a decrement value if said comparing step does not indicate a bit transition for every particular bit in said history.

4. The method of claim 2, further comprising the steps of:

maintaining a count value that represents the result of an integration function;

maintaining a suppression-stat variable that indicates the suppression status of said integration function; and in response to said transition signal, said step of suppressing said signaling bits comprises the step of generating a suppression signal based at least in part on said count value and said suppression-stat variable.

5. The method of claim 4, wherein said transition signal has said decrement value and said suppression-stat variable is in a disabled state, further comprising the step of resetting said count value to a minimum value.

6. The method of claim 4, wherein said transition signal has said decrement value and said suppression-stat variable is in an enabled state, further comprising the step of decrementing said count value by a non-suppress decrement value, wherein said non-suppress decrement value equals a user pre-set value.

7. The method of claim 4, wherein said transition signal has said increment value and said suppression-stat variable is in a disabled state, further comprising the step of incrementing said count value by one, said count value not to exceed a user-defined maximum value; and setting said suppression-stat variable to an enabled state if said count value reaches said user defined maximum value.

8. The method of claim 4, wherein said transition signal has said increment value and said suppression-stat variable is in an enabled state, further comprising the step of setting said count value to a user-defined maximum value.

9. The method of claim 4, wherein the step of suppressing said signaling bits comprises the steps of:

suppressing said particular bit of said current received word if said suppression-stat variable is in said enabled state, passing without change said particular bit of said current received word if said suppression-stat variable is in said disabled state;

combining the bits, other than the particular bit of said current received word, and said suppression signal, to generate an output word, wherein the bits other than the particular bit of said current received word are functionally the bits other than the particular bit of said output word, and said suppression signal being functionally said particular bit of said output word.

10. A computer-readable medium having computer executable instructions for performing the steps recited in claim 1.

11. A computer-readable medium having computer executable instructions for performing the steps recited in claim 2.

12. A computer-readable medium having computer executable instructions for performing the steps recited in claim 3.

13. A computer-readable medium having computer executable instructions for performing the steps recited in claim 4.

14. A computer-readable medium having computer executable instructions for performing the steps recited in claim 5.

15. A computer-readable medium having computer executable instructions for performing the steps recited in claim 6.

16. A computer-readable medium having computer executable instructions for performing the steps recited in claim 7.

17. A computer-readable medium having computer executable instructions for performing the steps recited in claim 8.

18. A computer-readable medium having computer executable instructions for performing the steps recited in claim 9.

19. The method of claim 1, wherein said series of received words is deterministically formatted, resulting in deterministically positioned bits, and the step of detecting said signaling bits comprises the step of:

comparing the content of each of said deterministically formatted words to identify a signaling bit sequence, and generating a transition signal, the transition signal having an increment value if said signaling bit sequence is detected and a decrement value if said signaling bit sequence is not detected.

20. The method of claim 19, wherein said step of detecting said signaling bits further comprises the steps of:

storing a history of said deterministically positioned bits of said received words, said history comprising a specified number of deterministically positioned bits from previous words that is equal to or greater than one;

if said history has reached said specified number of said deterministically positioned bits of said received words, remove oldest said deterministically positioned bit in said history and store a newest said deterministically positioned bit from said received words in a first in first out data flow method;

comparing said deterministically positioned bit of a current received word with said deterministically positioned bit of a deterministically formatted previous word;

as a result of said comparing step, generating a transition signal, the transition signal having an increment value if said comparing step indicates a bit transition for every deterministically positioned bit in said history, and a decrement value if said comparing step does not indicate a bit transition for every particular bit in said history.

21. The method of claim 19, further comprising the steps of:

maintaining a count value that represents the result of an integration function;

maintaining a suppression-stat variable that indicates the suppression status of said integration function; and in response to said transition signal, said step of suppressing said signaling bits comprises the step of generating a suppression signal based at least in part on said count value and said suppression-stat variable.

22. The method of claim 21, wherein said transition signal has said decrement value and said suppression-stat variable is in a disabled state, further comprising the step of resetting said count value to a minimum value.

23. The method of claim 21, wherein said transition signal has said decrement value and said suppression-stat variable is in an enabled state, further comprising the step of decrementing said count value by a non-suppress decrement value, wherein said non-suppress decrement value equals a user pre-set value.

24. The method of claim 21, wherein said transition signal has said increment value and said suppression-stat variable is in a disabled state, further comprising the step of incrementing said count value by one, said count value not to exceed a user-defined maximum value; and setting said suppression-stat variable to an enabled state if said count value reaches said user-defined maximum value.

25. The method of claim 21, wherein said transition signal has said increment value and said suppression-stat variable is in an enabled state, further comprising the step of setting said count value to a user-defined maximum value.

26. The method of claim 21, wherein the step of suppressing said signaling bits comprises the steps of:

suppressing said deterministically positioned bit of said current received word if said suppression-stat variable is in said enabled state, passing without change said deterministically positioned bit of said current received word if suppression-stat variable is in said disabled state;

combining the bits, other than the deterministically positioned bit of said current received word, and said suppression signal, to generate an output word, wherein the bits other than the deterministically positioned bit of said current received word are functionally the bits other than the deterministically positioned bit of said output word, and said suppression signal being functionally said deterministically positioned bit of said output word.

27. A computer-readable medium having computer executable instructions for performing the steps recited in claim 19.

28. A computer-readable medium having computer executable instructions for performing the steps recited in claim 20.

29. A computer-readable medium having computer executable instructions for performing the steps recited in claim 26.

30. The method of claim 1, wherein n is equal to 6 and the signaling bits are restricted to a particular bit within said word, said particular bit of four said series of received words making up a pattern of the form ABCD, and said comparing the contents step comprises comparing the values of said particular bits within each phase of the series of words to identify the signaling bit sequence.

31. The method of claim 30, wherein said step of detecting said signaling bits further comprises the steps of:
   storing a history of said particular bits of said received words, said history comprising a specified number of bits from previous words that is equal to or greater than four and containing at least said pattern of the form ABCD;
   if said history has reached said specific number of said particular bits of said received words, remove oldest said particular bit in said history and store a newest said particular bit from said received words in a first in first out data how method;
   within each phase, comparing the particular bit of a current received word with the associated bit of said pattern of the form ABCD stored in said history, such tat said particular bits of four said series of received words making up a pattern of the form ABCD is compared with said associated bits of said pattern of the form ABCD stored in said history.

32. The method of claim 31, wherein if said step of comparing the particular bit indicates a bit pattern of the form ABCD, then said comparison output provides a transition signal with an increment transition value.

33. The method of claim 31, wherein said step of comparing the particular bit further comprises the steps of:
   if said comparison indicates a bit pattern of the form ABCD, wherein said pattern of the form ABCD does not equal "1111" or "0000", then said comparison output provides a transition signal with an increment value;
   if said comparison indicates a bit pattern of the form ABCD, wherein said pattern of the form ABCD does equal "1111" or "0000", then said comparison output provides a transition signal with a decrement value.

34. A computer-readable medium having computer executable instructions for performing the steps recited in claim 30.

35. A computer-readable medium having computer executable instructions for performing the steps recited in claim 31.

36. A computer-readable medium having computer executable instructions for performing the steps recited in claim 32.

37. A computer-readable medium having computer executable instructions for performing the steps recited in claim 33.

38. An apparatus for detecting and suppressing signaling bits in received words of data, the apparatus comprising:

an input for accepting received data, said received data containing signaling bits and being organized as a series of words, said series of words organized in phases of size n such that every $n^{th}$ word in said series of words belongs to a particular phase;
an output for providing suppressed bit data, said suppressed bit data being received data with the signaling bits having been suppressed;
a memory buffer for providing storage for at least a portion of said received data and for storing a program module;
a processing unit responsive to instructions in said program module, being operative to:
   access said received data;
   detect said signaling bits in said received data by comparing the content of each word in a particular phase to identify a signaling bit sequence and generating a transition signal, the transition signal having an increment value if said signaling bit sequence is detected and a decrement value if said signaling bit sequence is not detected;
   suppress said signaling bits in said received data; and
   provide suppressed data to the output.

39. The apparatus of claim 38, wherein the signaling bits are embedded within particular bits of a subset of words within said series of words, the memory buffer being operative to buffer n bits of the particular bits and the processing unit is operative to detect said signaling bits by parsing said memory buffer to detect said signaling bits.

40. The apparatus of claim 38, wherein the signaling bits are embedded within particular bits of a subset of words within said series of words, the memory buffer being operative to buffer n bits of the particular bits and the processing unit is operative to detect said signaling bits by being operative to:
   compare a current particular bit with the $n^{th}$ particular bit in said memory buffer; and
   generate the transition signal.

41. The apparatus of claim 40, wherein a suppression-stat variable and a count value is maintained by the processing unit, and when the suppression-stat variable is in a suppression disabled state, the processing unit is operative to suppress said signaling bits by being operative to:
   modify a count value, by incrementing each time the compare operation results in generating a transition signal having an increment value;
   modify a count value, by decrementing each time the compare operation results in generating a transition signal having a decrement value;
   generate a suppression signal, the suppression signal being set to a suppression enable state when the count value reaches a particular threshold, the suppression signal being set to a suppression disabled state when the count value reaches a minimum value, and the suppression signal being associated with said current particular bit; and
   replace said particular bit with a known value if the suppression signal is set to a suppression enable state, whereby the particular bit becomes a suppressed bit.

42. The apparatus of claim 41, wherein the processing unit is further operative to store the value of the suppression signal into the suppression-stat variable and to:
   combine the suppressed bit with the received data, the suppressed bit replacing the particular bit in the received data, whereby suppressed bit data is generated.

* * * * *